US006423893B1

(12) United States Patent
Sung et al.

(10) Patent No.: US 6,423,893 B1
(45) Date of Patent: *Jul. 23, 2002

(54) METHOD AND SYSTEM FOR ELECTRONICALLY CREATING AND PUBLISHING MUSIC INSTRUMENT INSTRUCTIONAL MATERIAL USING A COMPUTER NETWORK

(75) Inventors: Christopher Sung, New York, NY (US); Sean Kelly, Seattle, WA (US)

(73) Assignee: Etonal Media, Inc., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/419,667

(22) Filed: Oct. 15, 1999

(51) Int. Cl.⁷ .............................................. G09B 15/02
(52) U.S. Cl. .............................. 84/645; 84/600; 84/609; 84/610; 84/477 R
(58) Field of Search ................... 84/600–602, 609–610, 84/634, 645, 649–650, 666, 477 R, 478; 380/4; 709/217–219, 227, 229

(56) References Cited

U.S. PATENT DOCUMENTS

| | | | |
|---|---|---|---|
| 3,837,256 A | 9/1974 | Gullickson | 84/478 |
| 4,386,551 A | 6/1983 | Morgando | 84/477 R |
| 4,624,170 A | 11/1986 | Ohno et al. | 84/622 |
| 4,791,848 A | 12/1988 | Blum, Jr. | 84/453 |
| 5,408,914 A | 4/1995 | Breitweiser, Jr. et al. | 84/477 R |
| 5,457,282 A | 10/1995 | Miyamoto et al. | 84/634 |
| 5,585,583 A | 12/1996 | Owen | 84/477 R |
| 5,728,960 A * | 3/1998 | Sitrick | 84/477 R |
| 5,734,119 A * | 3/1998 | France et al. | 84/645 |
| 5,889,860 A * | 3/1999 | Eller et al. | 380/4 |

* cited by examiner

*Primary Examiner*—Marlon T. Fletcher
(74) *Attorney, Agent, or Firm*—Morrison & Foerster LLP

(57) ABSTRACT

A system and method that allows an on-line user of a wide area network to remotely author and publish instructional material for musical instruments for the purposes of dissemination to other on-line users. Authors create solo musical passages pertaining to a specific instrument, accompanying musical arrangements and textual annotations which are stored on a remote server. This information is then dynamically published visually as standard music notation or tablature, and can be heard aurally as either digital audio or by using the Musical Instrument Digital Interface (MIDI) standard. The playback of musical examples in this material may be customized, allowing users to change the tempo of the music, to modify the instrument sounds used, or to play subsets of the presented musical examples. Authors can update their music at any time, and since the music is dynamically published, these changes are instantaneously reflected in its published visual and aural forms. All authoring, publishing, and viewing of this material uses temporary applications that operate with a standard Internet browser in conjunction with software that operates on the remote server. These applications utilize the HyperText Transport Protocol (HTTP) that is a standard protocol of the World Wide Web.

26 Claims, 9 Drawing Sheets

Page1: "Hip Licks and Tricks:          *Return to Lesson Builder

General Paramters

130 — Tempo: [170 ▼]      First Displayed Measure Number: [1 ▼] — 132

Sequence 1 Parameters (Sequence 1 is shown in tablature)

134 — Title: [48: Blues Lick ▼]   using meas: [1 ▼] to [4 ▼] — 138

Sequence 2 Parameters

136 — Title: [None ▼]   using meas: [1 ▼] to [1 ▼]

Groove Parameters

139 — Title: [8: E Blues Groove 1 ▼]   using meas: [1 ▼] to [4 ▼] — 140

Lesson Text (you can include HTML)

142 — [I always like to start off with a quick two-fret bend up to the high E and just milk it before I descend. It creates this great tension that you can use to just unload with a cool lick like the one shown in measure 2.]

[Play Page]   [Save Page]   [View Page]   [Delete Page]
    144        146        148        150

METHOD AND SYSTEM FOR ELECTRONICALLY CREATING AND PUBLISHING MUSIC INSTRUMENT INSTRUCTIONAL MATERIAL USING A COMPUTER NETWORK

BACKGROUND OF THE INVENTION

The creation or presentation of instructional material for musical instruments has been disclosed in U.S. patents and in current products. For example, U.S. Pat. No. 5,585,583 entitled Interactive Musical Instrument Instruction System describes a means to utilize a CD-ROM electronic storage medium to store audio and video musical instrument instructional materials. Animation, voice, music, video and imagery are integrated in real-time and provide complete control to the music student. Similarly, instructional CD-ROMs that integrate animation, voice, music, video and imagery to aid the music student in an instructional environment are commercially available. The described systems operate as installed applications on a local computer. Instructional material is not available to the on-line user nor as a web-based application. Additionally, the systems do not allow a user to author the instructional material.

A number of music sequencing computer software programs are available that install and operate on the hard drive of a local computer and allow users to compose and to notate music examples. Examples of such programs are Logic Audio, from Emagic Soft und Hardware GmbH, Rellingen, Germany and Cubase, from Steinberg Soft und Hardware GmbH, Hamburg, Germany. Music sequencers provide users with an interface to input musical information, to edit this information, to play back this information as music, and in most cases, to print out the music in either standard music notation or tablature. Tablature is another form of visual notation for a musical performance. It often offers instrument-specific information to a musician, and there are variants of tablature depending on the musical instrument of interest. For example, guitar tablature tells a guitarist the exact string and fret to use when playing a specific note. For a drummer, drum tablature specifies which drum (such as a snare or a bass drum) is to be used for a particular musical event. None of these computer programs allow its user to store this information on a remote server over a wide area network such as the Internet or to instantaneously publish this information as music instructional material to on-line users. None of these computer programs exist as a web-based application.

An authoring and display system for digital sheet music has been disclosed by the Sunhawk Corporation, Seattle, Wash. In this system, authors install software on their local computer to create musical scores featuring standard music notation and tablature. Users of this information install a viewer on their local computer, and can download musical scores from the Internet, which were created by the authoring software. The viewer allows a user to examine these musical scores and to listen to these scores as MIDI music. However, neither the authoring nor viewing system can store, modify, or access information on a remote server over a wide area network such as the Internet. Neither the authoring nor viewing system exists as a web-based application.

Several patents disclose special apparatus to aid students with the performance of their instrument. U.S. Pat. No. 3,837,256 entitled Sight And Sound Musical Instrument Instruction, describes an apparatus that uses illumination means associated with certain keys or frets of musical instruments to teach music students. U.S. Pat. No. 4,386,551 entitled Method And Apparatus For Teaching Musical Instruments, describes a method and apparatus for simultaneously teaching multiple students how to play a musical instrument. U.S. Pat. No. 4,791,848 entitled System For Facilitating Instruction Of Musicians, and U.S. Pat. No. 5,408,914 entitled Musical Instrument Training System Having Displays To Identify Fingering, Playing and Instructional Information both describe systems that use a fingering display to guide a music student in his or her performance, and an input mechanism to record or analyze the student's performance. All of these patent require a special apparatus. None of them are available to the on-line user as a web-based application and none have any notational output.

U.S. Pat. No. 5,457,282 entitled Automatic Accompaniment Apparatus Having Arrangement Function With Beat Adjustment, describes an apparatus for memorizing, storing, editing, and reproducing musical accompaniment patterns. Again, special apparatus is required and there is no teaching of availability to the on-line user as a web application. Similarly, a computer software application called "Band-in-a-Box" from PG Music, Victoria, B.C. allows users to specify a musical arrangement using a small number of parameters. Users pick specific music chords to play in each measure of an arrangement, pick a musical style (such as jazz or rock) and the software generates a musical arrangement. This concept is also embodied in U.S. Pat. No. 4,624,170 entitled Electronic Musical Instrument With Automatic Accompaniment Function, which describes an electronic instrument that allows the user to manually select different kinds of rhythms and automatic accompaniment patterns. This concept has been implemented in some electronic keyboards made by manufacturers such as Casio and Yamaha, which allow the user to choose and play an accompaniment style to supplement their solo playing on the instrument itself. Band-in-a-Box provides additional functionality by allowing users to print out a score of their musical arrangement. None of these patents or products allow its users to store this information on a remote server over a wide area network such as the Internet. They do not allow users to create or publish this information using the World Wide Web, nor do they exist as web-based applications.

SUMMARY OF THE INVENTION

The present invention provides temporary web-based applications that reside in a standard web browser. The invention allows a user (1) to remotely create, update, and store instructional material for various musical instruments, (2) to dynamically interpret subsets of stored information for to permit the display of visual notation of musical examples and descriptive text in a standard web browser, and (3) to dynamically interpret subsets of stored information to provide customizable music playback using a standard web browser.

The present invention further provides for open access to this electronic authoring, publishing, and display system to any Internet user with a standard web browser. This enables users to create, publish, and view music instructional material upon their first encounter with the system.

Another advantage of the present invention is that it allows users to compose, edit, and publish solo musical instrument passages, with customizable music playback, using a standard web browser.

Still another advantage of the present invention is that it allows users to compose, edit, and publish musical arrangements using a standard web browser, with customizable music playback. In addition, users can create arrangement templates that govern the specific individual instrument parts that comprise the arrangements. Such arrangement templates, or "musical style sheets," can be shared among users of the system, thereby allowing users to pick an arrangement style that best fits the musical examples they present in their published instructional material from a variety of user-generated arrangement templates.

A further advantage of the present invention is that it allows users to combine solo musical passages and musical arrangements in a musical instructional example using a standard web browser, with customizable music playback of the combined musical output.

Yet another advantage of the present invention is that it allows users to augment their musical examples with explanatory text, images, tables, and diagrams, thus providing all of the basic elements normally associated with music instructional material.

BRIEF DESCRIPTION OF THE DRAWINGS

FIG. 8 illustrates an exemplary visual interface for combining solo musical passages, ensemble arrangements, and instructional text or HTML to create music instructional material using the present invention.

FIG. 9 illustrates an exemplary published visual instructional output of the present invention.

DETAILED DESCRIPTION

The invention uses a computer network such as the Internet and allows on-line users to create solo musical instrument passages and ensemble arrangements using a standard World Wide Web browser and to store such passages and arrangements in a remote server system. Using the invention, an author can, for example, associate solo musical instrument passages and ensemble arrangements with descriptive text, images, tables, or diagrams, so as to create interactive musical instructional material. The visual displays and aural playback are generated dynamically using interpretive software that operates on the remote server system.

The process is dynamic in that the information displayed and played does not exist as such prior to its generation by the system. Neither the visual display nor the aural playback of music examples exists as a file on the remote server system. The visual display of musical examples is first constructed only after a user requests to view instructional material. Similarly, a data representation for music playback is constructed only after a user makes a request to hear a musical example. There are no preexisting files on the remote file system that correspond to either of these system responses to user requests.

Figure 1:
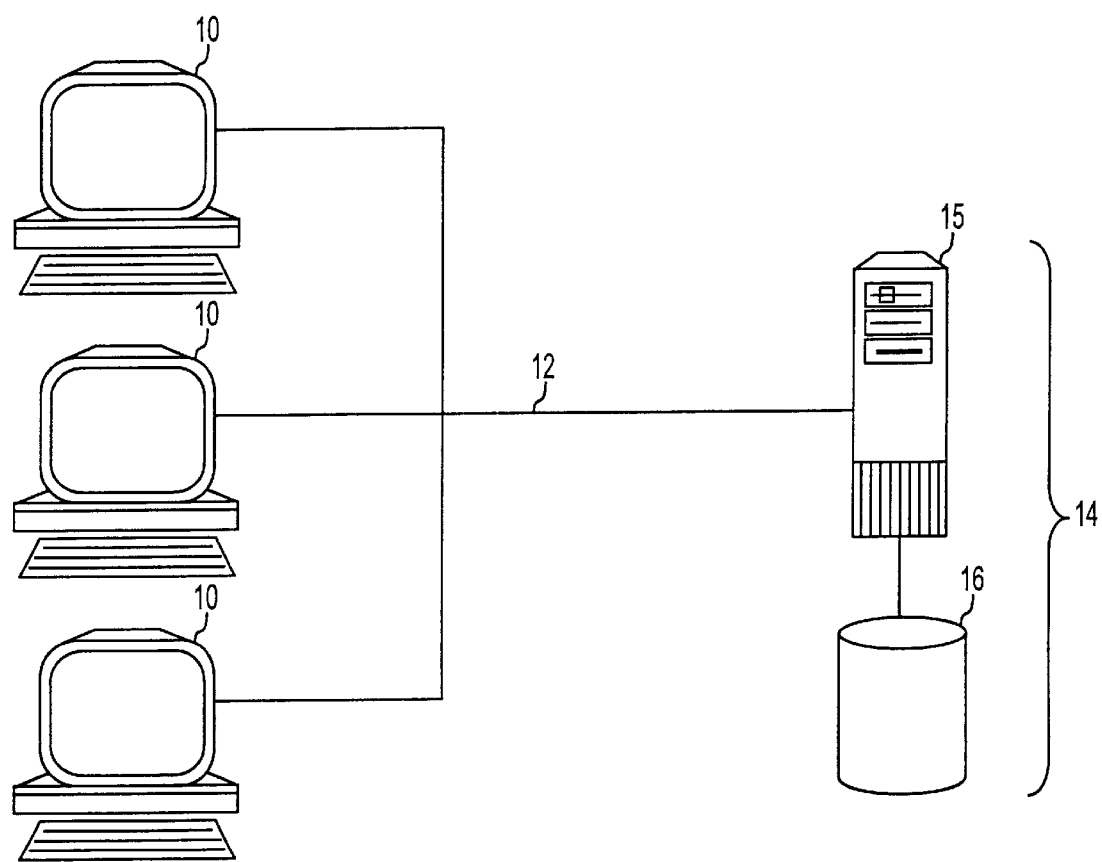
FIG. 1 illustrates the preferred embodiment of the present invention.

The present invention is preferably implemented in a computer environment illustrated in FIG. 1. A plurality of client computers 10, each running a standard web browser, simultaneously access a remote server system 14 using an Internet connection 12. The remote server system 14 comprises a web server 15 operating with conventional web server software and a database 16 operating with conventional database software. The remote server system 14 may comprise a single computer running both web server software and database server software, or may be configured with web server software and database server software running on separate computers, with both computers being connected via a conventional local area network. In either configuration, the web server software and the database software communicate using a standard database protocol such as the Open Data Base Connectivity (ODBC) standard.

Figure 2:
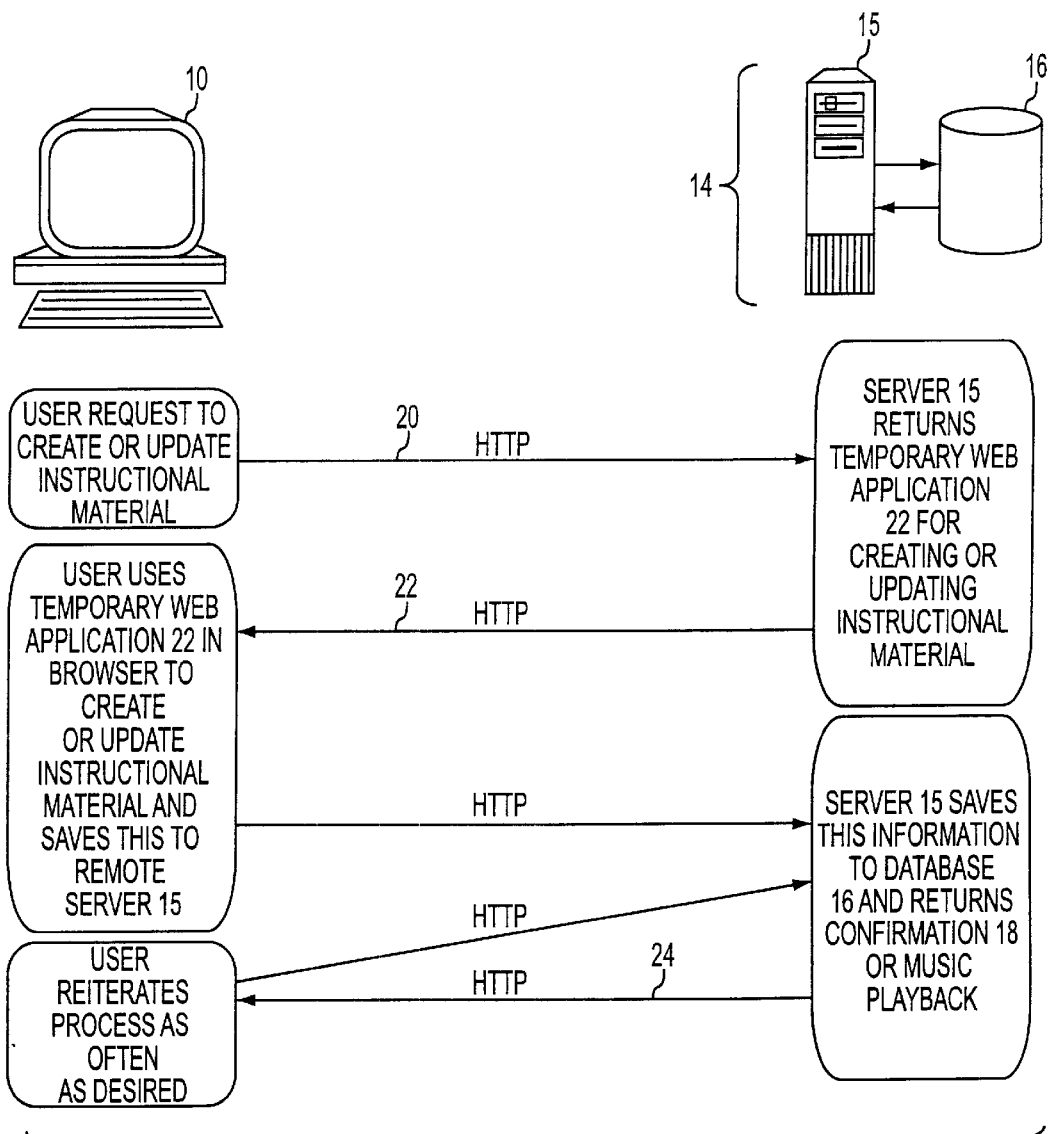
FIG. 2 is a block diagram representing a series of events that occur when a user creates music instructional material using the present invention.

An author using the invention can create and update music instructional material as illustrated in FIG. 2. A user of a client computer 10, acting in the role of an author, requests a temporary web application 22 to create or update four types of information: (1) a solo musical instrument passage; (2) a musical ensemble arrangement; (3) a musical arrangement template; or (4) explanatory text or HTML describing these pieces of music and how these pieces of music should be combined in an instructional lesson page, as illustrated at 20. The web applications 22 are referred to as temporary in that they are only available when a user accesses a specific web page that contains the application. Each of these four types of information has a corresponding temporary web application 22 on the server 15 for creating and updating information. Together, these four types of information describe an instructional lesson page. In response to the request 20, the remote web server 15 sends the appropriate temporary web application 22 to the browser on the author's computer 10.

If the author is requesting to update pre-existing material, the server 15 also returns "meta-data" to configure the current temporary web application 22 to a state that reflects the current version of the requested information; the term meta-data referring to an encoded representation of any of these four types of information which may be in a text based format such as American Standard Code for Information Interchange (ASCII) or in a binary format. For example, depending on the type of information being updated, meta-data may include: (1) a representation of a solo musical passage in ASCII format; (2) an ASCII representation of a musical ensemble arrangement; (3) an ASCII representation of a musical arrangement template (or "musical style sheet"); or (4) explanatory text and HTML describing these pieces of music and how these pieces of music should be combined in an instructional lesson page.

If the author is not updating preexisting material, the current temporary web application 22 is configured to a default state with no current information. The author uses the current temporary web application 22 to create or edit one of the four types of information within the author's browser. When an author wishes to save his or her work, the appropriate meta-data representing the current state of the information is formulated by the current temporary web application 22, and is sent over the network to the remote server 15, where it is stored in the database 16. Depending upon the type of request 20 from the author, the server 15 may return, as represented at 24, a simple confirmation that the storage was successful, or aural music data that represents the piece of music on which the author is currently working. An author may reiterate this process of refining any of these four types of information using the appropriate temporary web application 22 as often as necessary to convey the point of the instructional material.

Figure 3A:
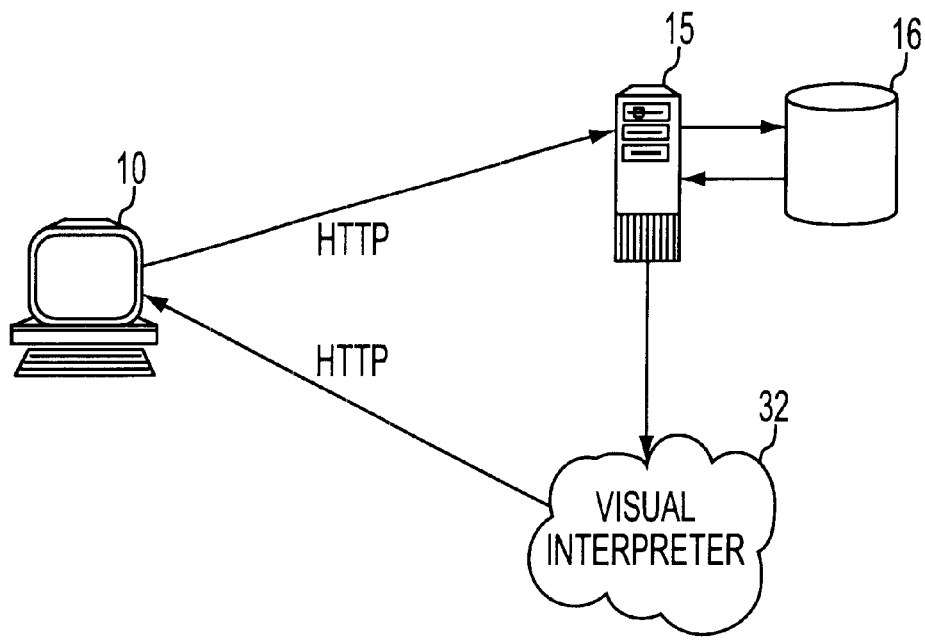
FIGS. 3A and 3B represent the events that occur when a user sends a request to either view instructional material or hear musical examples.
Figure 3B:
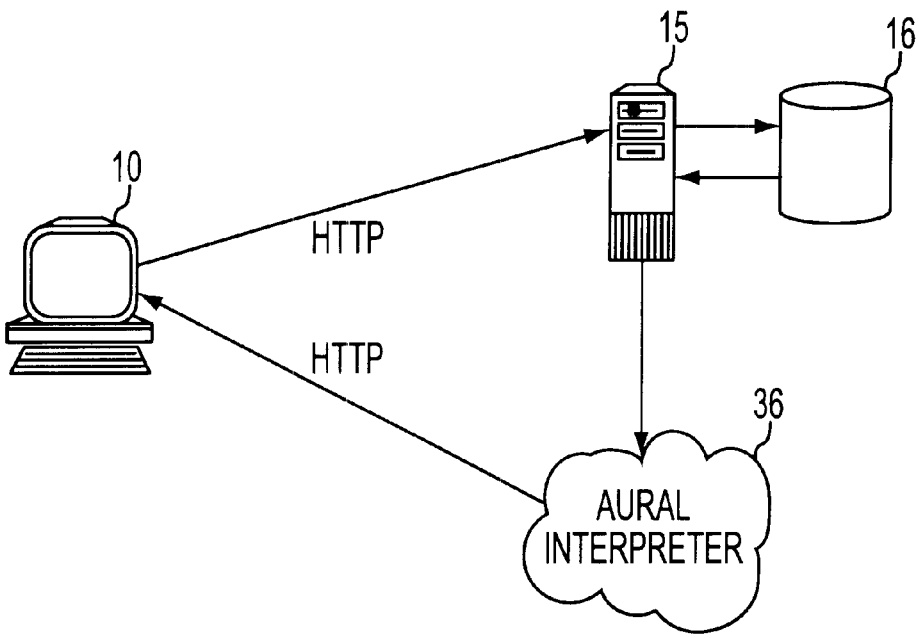

FIGS. 3A and 3B depict how a user can view an instructional lesson page and can hear musical examples associated with the instructional lesson page. As shown in FIG. 3A, to view an instructional lesson page, a user at computer 10 using a standard web browser and Internet connection, sends a request for a specific instructional lesson page from the remote web server system 14 using the HTTP protocol. The web server 15 processes the request and retrieves the information for this instructional lesson page from the database 16. The retrieved information consists of: (1) a database record describing which pieces of music are associated with this instructional lesson page; (2) meta-data for sole any musical passages associated with this instructional lesson page; (3) meta-data for any musical ensemble arrangements associated with this instructional lesson page; (4) meta-data for any musical arrangement templates associated with this instructional lesson page; and (5) explanatory text and HTML associated with this instructional lesson page. The remote web server system 14 dynamically constructs a web page based on this retrieved information. Solo musical passages and musical ensemble arrangements associated with this instructional lesson page are converted from their meta-data format in the database 16 to a visual image display using a visual software interpreter 32 that operates on the remote web server system 14.

Figure 4A:
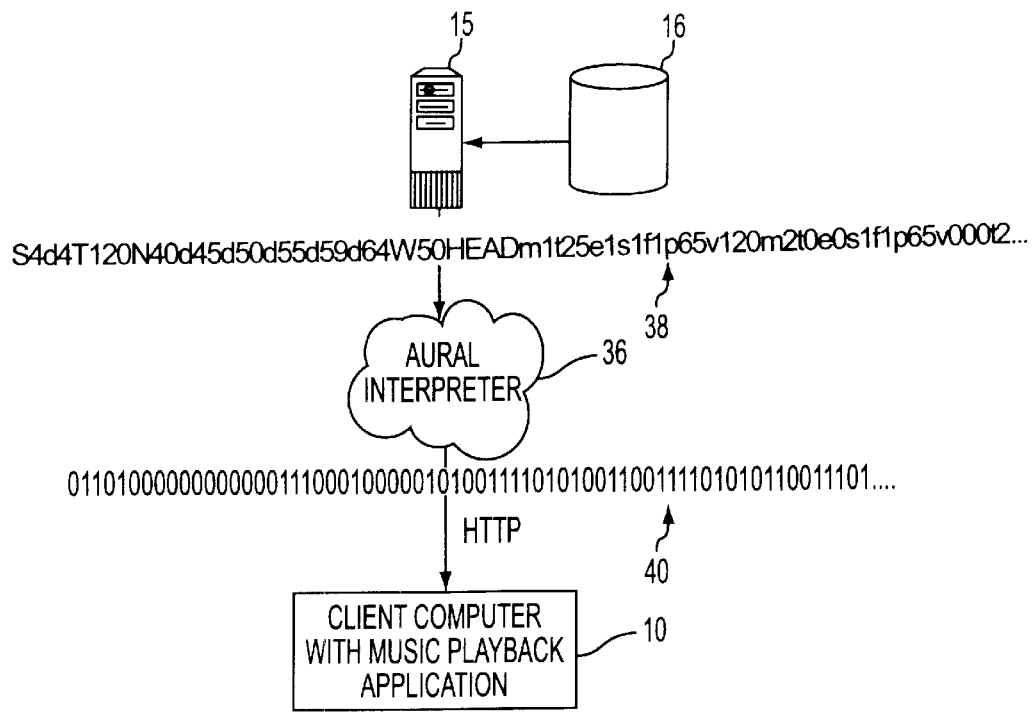
FIGS. 4A and 4B illustrate how data is retrieved from a database, processed by interpretive software on a remote server and sent to a user's browser either as Musical Instrument Digital Interface (MIDI) data for aural playback or as HyperText Markup Language (HTML) data for visual display.
Figure 4B:
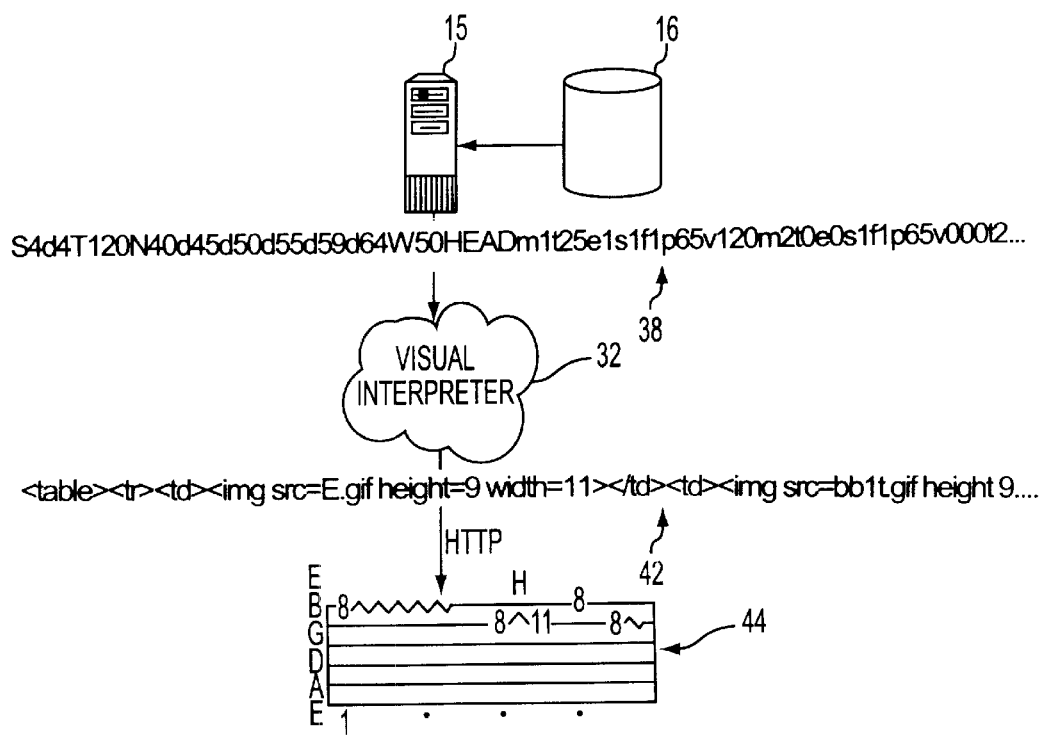
Figure 6:
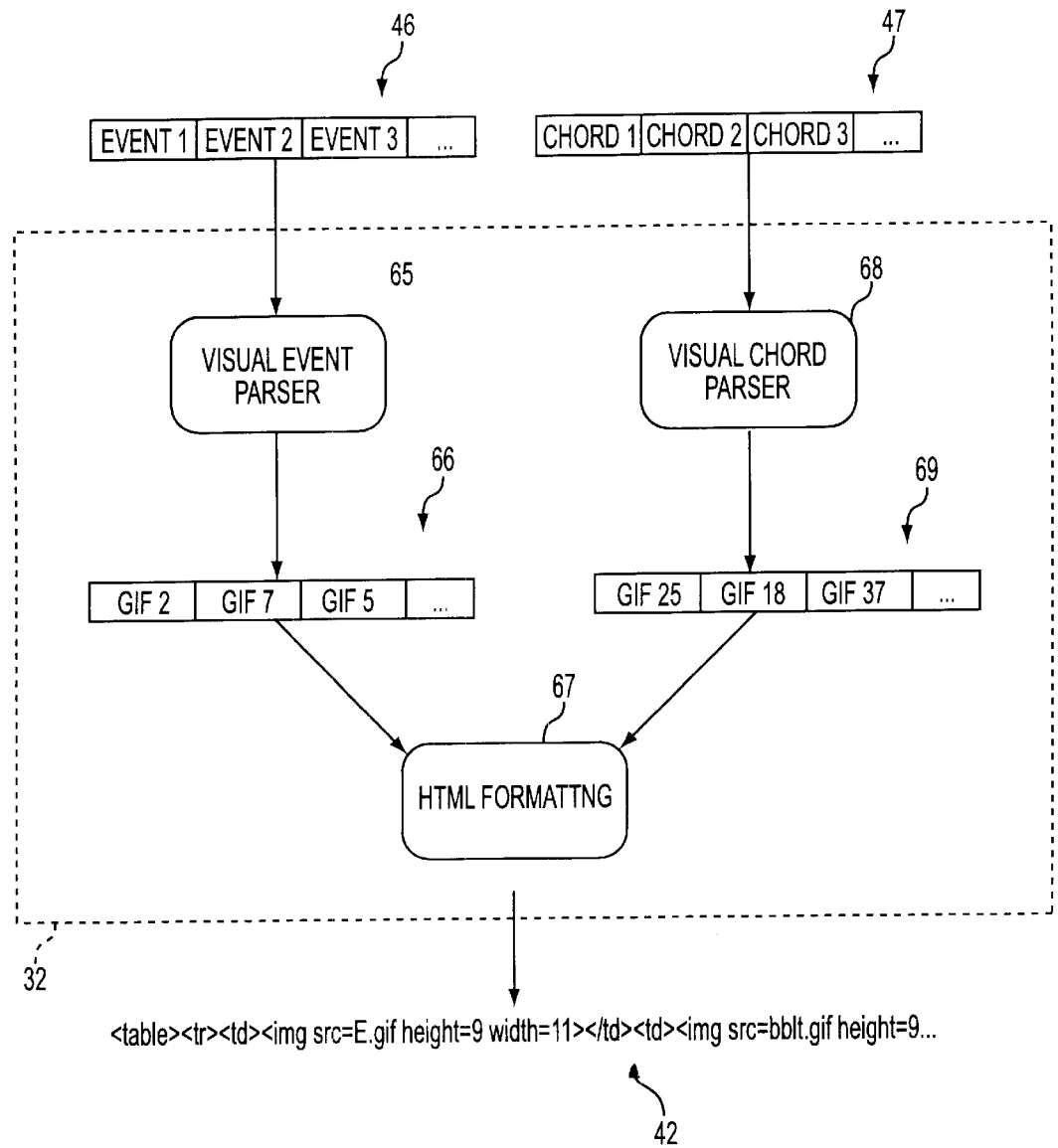
FIG. 6 illustrates how the visual interpreter of the present invention takes meta-data as input and provides HTML output that forms the visual notation of a musical example in an instructional lesson page.

The visual software interpreter 32, which is further elaborated upon with reference to FIGS. 4B and 6, outputs HTML that describes the exact placement of a series of pre-rendered images in graphical image format (GIF). Taken as a whole, this series of images forms a reproduction of the visual notation for the musical example associated with this instructional lesson page. The HTML output of the visual interpreter 32 is combined with any explanatory text or HTML describing these pieces of music and the combined output, constituting the requested instructional lesson page, is returned to the user's web browser using the HTTP protocol. The user also receives HTML controls to govern the playback of a musical example in the requested instructional lesson page. The ability to customize music playback is important in a learning environment because it allows a user to tailor aspects of the playback to his or her skill level. Those who wish to play along with the music benefit from this ability because they can specify a subset of the music, slow down or speed up its tempo, add a metronome click, or loop the music so that it plays indefinitely.

As shown FIG. 3B, if a user sends a request for music playback, the request is sent to the remote web server 14 via HTTP along the user's playback preferences, such as start measure, end measure and tempo. The remote web server 15 processes the request and retrieves the information for this instructional lesson page from the database 16. Solo musical passages, musical ensemble arrangements, and musical arrangement templates associated with this instructional lesson page are converted from their respective meta-data format in the database 16 to either digital audio or MIDI data using an aural software interpreter 36 that operates on the remote web server 14. The aural interpreter 36 incorporates the user's playback preferences as it dynamically creates the binary output audio data, and this output is returned to the user's web browser using the HTTP protocol. The structure and operation of the aural interpreter 36 is further elaborated upon with reference to FIGS. 4A and 5.

FIGS. 4A and 4B depict the process by which meta-data is interpreted and is output as either visual or aural representations. As shown in FIG. 4A, to convert ASCII meta-data 38 representing a music example into binary digital audio or MIDI data 40, the ASCII meta-data 38 is retrieved from the database 16 and input to the aural interpreter 36. The aural interpreter 36 is a computer program which translates the meta-data 38 into binary data 40 in a known audio format, such as MIDI. This aural binary data 40 is then sent by the remote server 14 to the client computer 10 using the HTTP protocol. Conventional web browsers are configured to accept different types of data using conventional "helper" computer programs or applications. In the case of digital audio or MIDI data, standard web browsers use a conventional helper application to specifically handle this type of data. The helper application receives the aural binary data 40 via the web browser and converts it into music on the client computer 10.

FIG. 4B illustrates the conversion of ASCII meta-data 38 describing solo musical passages or ensemble arrangements into useful visual image representations in a web browser. The meta-data 38 is retrieved from the database 16 by the visual interpreter 32 which translates the meta-data 38 into HTML data 42. The HTML data represents the visual notation of the musical example and describes the exact placement of a series of pre-rendered GIF images. Taken as a whole, this series of GIF images forms a reproduction of the visual notation for the musical example. This HTML data 42 is then sent by the remote server 14 to the client computer 10 using HTTP. The client computer 10 receives this data 42 and displays it in a web browser as a published visual representation 44 of the musical example.

Figure 5:
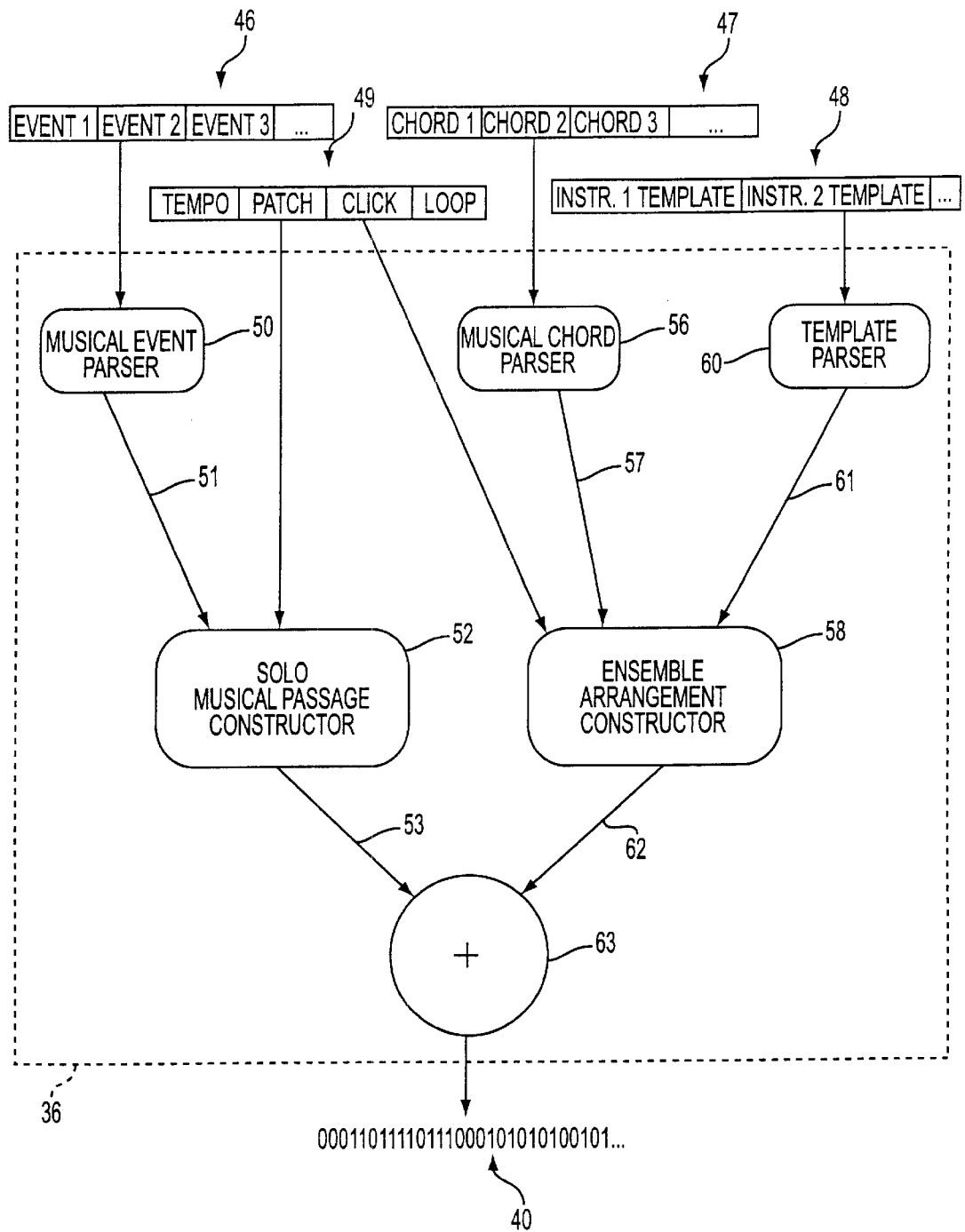
FIG. 5 illustrates how the aural interpreter of the present invention takes meta-data and a user's playback preferences as input and provides binary data output which represents a musical example in an instructional lesson page.

FIG. 5 illustrates how the aural interpreter 36 transforms meta-data 38 comprising (1) a solo musical instrument passage 46, (2) a musical ensemble arrangement 47, (3) an accompaniment template 48, and (4) a user's playback preferences 49, into digital data 40 that aurally represents the musical example. Meta-data for a solo musical instrument passage 46 represents musical events associated with a particular solo instrument performance. For example, for a guitar, these events might include a pluck, a slide, a bending of a string, or any other particular technique. For a piano, the events might include striking a key or holding own the sustain peddle. The events in this passage are sent to a musical event parser 50 which separates each individual event and sends a list of events 51 to a solo musical passage constructor 52. The list of events 51, originally represented by its meta-data 46, along with the user's music playback preferences 49, are passed to the solo musical passage constructor 52. The constructor 52 looks at the list of events 51 and constructs data 53, in digital audio or MIDI format, corresponding to the list of events 51 and to the user's playback preferences 49.

A similar process is used to create any accompanying music in a musical example. Meta-data for a musical ensemble arrangement 47 represents a series of musical chords that are to be played at certain times during music playback. The meta-data for a musical ensemble arrangement 47 is sent to a musical chord parser 56, which separates each individual chord into a list of chords 57 which are passed on to an ensemble arrangement constructor 58. Meta-data for the accompaniment template 48 represents a series of rules about how instruments in the ensemble arrangement are to embellish the chords represented by the musical arrangement meta-data 47. The meta-data for the accompaniment template 48 defines the style or musical genre that will govern the resulting musical accompaniment. This meta-data for the accompaniment template 48 is sent to a template parser 60, which extracts style rules 61 governing each instrument in the ensemble. These style rules 61 are then sent to the ensemble arrangement constructor 58 which looks at the list of chords 57 from the musical chord parser 56, and using the style rules 61 from the template parser 60, constructs digital audio or MIDI data 62 corresponding to the list of chords 57, the style rules 61, and the user's playback preferences 49. The binary data for the solo musical instrument passage 53 and the binary data for the accompanying music 62 are 10 combined, as represented at 63, to form a single binary output 40 of either digital audio or MIDI data.

FIG. 6 illustrates how the visual interpreter 32 transforms meta-data representing a solo musical instrument passage 46 and meta-data representing a musical ensemble arrangement 47 into HTML that visually represents the musical example. Meta-data for a solo musical instrument passage 46 is sent to a visual event parser 65. The visual event parser 65 extracts each event, selects a set of pre-rendered GIF images that represents that event, and stores the filenames of the selected set of GIF images in an array 66. This array 66 of GIF image filenames is passed to the HTML formatter 67. Similarly, meta-data for an ensemble arrangement 50 is sent to a visual chord parser 76. The visual chord parser 76 extracts each chord from the arrangement and determines which pre-rendered GIF images represent that chord. The filenames of these associated GIF images are stored in an array 82 and the array is passed to the HTML formatter 84. The HTML formatter takes the array of image filenames corresponding to the solo musical instrument passage 66 and the array of image filenames corresponding to the ensemble arrangement 69 and combines them to form a single output comprising HTML data 42.

Figure 7A:
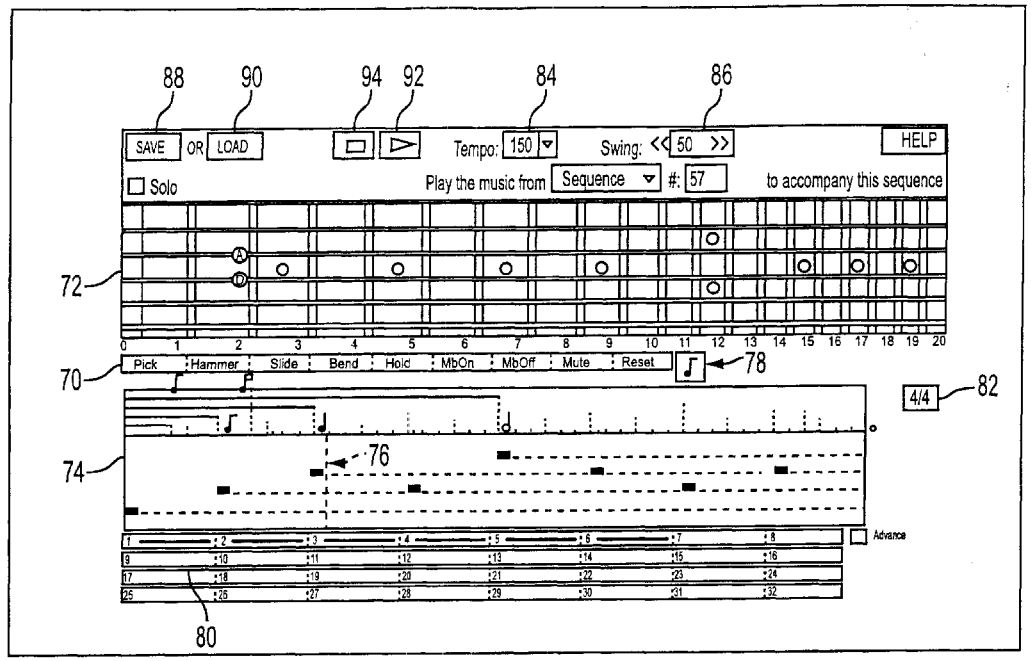
FIGS. 7A and 7B illustrate exemplary visual interfaces for temporary web applications that authors use to create solo musical passages for the guitar, and ensemble arrangements using the present invention.

FIGS. 7A–9 illustrate exemplary interfaces that may appear on the browser of a client computer 10 when the instrument of interest is a guitar. FIG. 7A illustrates an exemplary interface that could be used, for example, by a user/author to create a solo guitar passage using a temporary web application 22. An author chooses a musical event type 70 such as a pick, hammer-on, slide, or other guitar-related techniques, and selects the guitar fretboard representation 72, using, for example, a mouse-controlled cursor. Created events appear in a measure timeline 74 which shows all activity for the current musical measure. The author's current place in the measure is indicated by the cursor 76. The duration of these events are determined by a duration menu 78 and is reflected in the timeline 74. Authors can choose different measures to edit using a second timeline 80 which is more coarse than the measure timeline 74. Authors use other sections of the interface to choose the time signature 82, tempo 84, and the amount of swing 86, which adds a rhythm offset to certain notes in the passage for the purposes of reproducing a musical effect that is common in jazz music. A Save option 88 allows the author to save the meta-data that defines the current musical passage to the remote server and database over the Internet. A Load option 90 allows the author to load the meta-data for the last saved version of the passage from the remote server and database into this temporary web application. A Play option 92 allows the author to play back the current musical passage. Selecting this option causes the temporary application to save its meta-data for the current passage to the remote server and database over the Internet. In response, the remote server returns either MIDI or digital audio data to the author's browser, allowing them to hear the result of their editing. A Stop option 94 allows the author to stop the playback of this returned aural data.

Figure 7B:
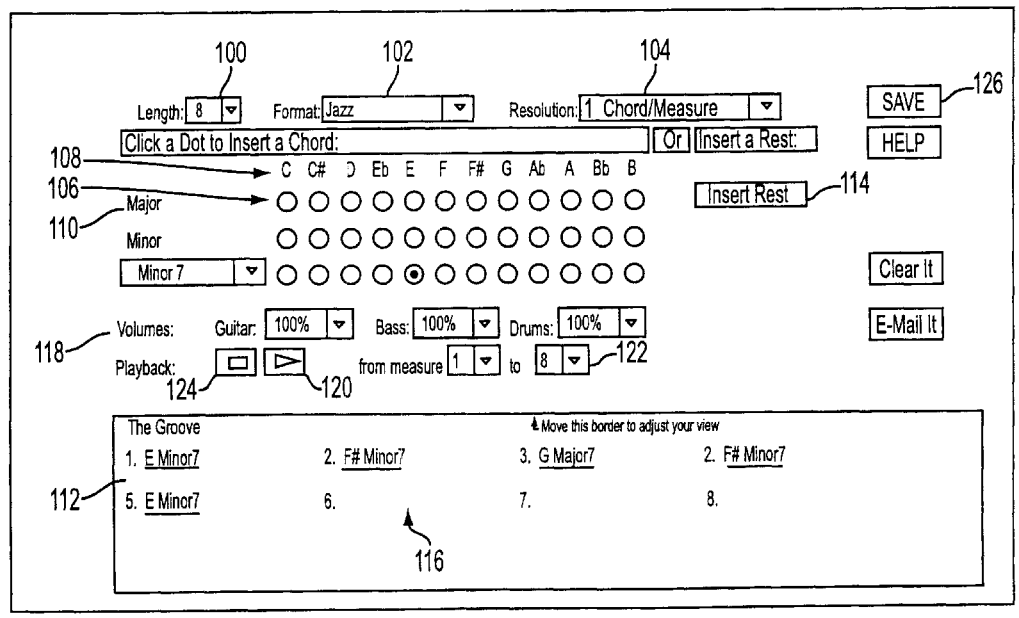

FIG. 7B illustrates an example of an interface for a temporary web application that authors use to create ensemble arrangements. Authors use the top section of the interface to choose the number of musical measures for their arrangement 100, a musical style format 102, and the number of musical chords that can appear in a measure 104. Again, selecting can be performed by a conventional, mouse-controlled cursor. By selecting the intersection 106 of a root note 108 (e.g., C, C#, D) and a chord quality 110 (e.g., Major, Minor, Minor 7) a specific chord can be inferred and entered into the display for the arrangement 112. Alternatively, authors can insert rests into the arrangement 114 where no particular chord is applicable. Authors can edit any of the specified chords in the arrangement by selecting its name in the display of the arrangement 112. The highlighted slot 116 in the display of the arrangement 112 shows the author's current location in the arrangement. The author can change the "mix" of volumes for the instruments in the arrangement by selecting a volume 118 for each instrument. By selecting a Play option 120, the author can listen to the current arrangement, and can also select a subset of measures 122 to be included in this playback. Selecting this option causes the temporary application to send its meta-data for the current arrangement to the remote server. In response, the remote server returns either MIDI or digital audio data to the author's browser, allowing them to hear the result of their editing. A Stop option 124 allows the author to stop the playback of this returned aural data. A Save option 126 allows the author to save the meta-data that defines the current musical ensemble arrangement to the remote server and database over the Internet Authors using the invention may also combine musical solo passages, ensemble arrangements, and descriptive text or HTML to create or update their published music instructional material. FIG. 8 illustrates an exemplary interface from a temporary web application that allows users to input, edit, and save this information. Authors select the tempo 130 of the combined musical example, and the measure number 132 of the first measure that will be shown in the published visual output. Authors select from a list of solo musical passages 134, 136 to include in the current musical example, and the subset of measures 138 of these passages that are to be included. Authors select an ensemble arrangement 139 to include in the current musical example, and the subset of measures 140 of this arrangement 139 that is to be included. Authors enter any text or HTML 142 that describes the musical concept being presented. A Play option 144 allows the author to listen to the current musical example that is defined by the current configuration of this temporary application. A Save option 146 allows the author to save this configuration data that defines the current musical instructional material to the remote server and database over the Internet. A View option 148 allows the author to save this configuration data that defines the current musical instructional material to the remote server and database over the Internet, and to view the visual output of this material in published form. A Delete option 150 allows the author to delete all configuration data for this musical instructional material from the remote database.

Figure 9:
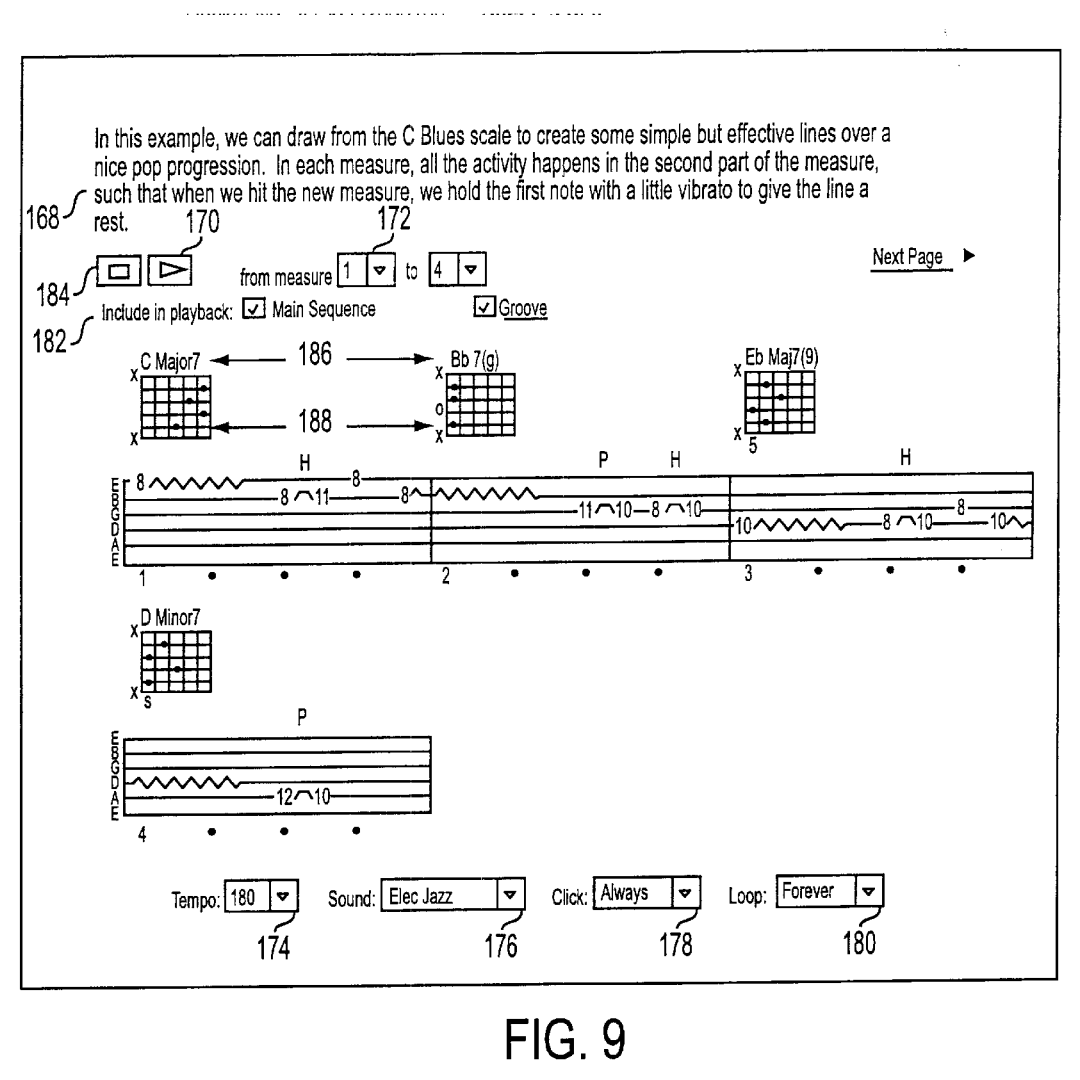

An exemplary interface for the published visual output of the system is depicted in FIG. 9. Descriptive text and HTML 168 is shown at the top of the figure, and describes the accompanying musical example. A palette of playback options is shown below this description. A Play option 170 allows the user to play back the musical example shown in the page. The user can select the subset of measures 172 of musical example that is to be included in the playback. In addition, the user can customize the playback of this example by choosing an appropriate tempo 174 or instrument sound 176, by adding a metronome click 178 to the example, or by looping 180 the example. The user can also decide which parts 182 will be included in the music playback. FIG. 9 depicts a choice of just the solo musical instrument passage, the ensemble arrangement, or both. When the user selects the Play option 170, all of these preferences are passed to the remote server over the Internet. In response, the remote server returns either MIDI or digital audio data to the author's browser. This data corresponds to the musical example shown in the page, and is amended based upon the playback preferences of the user. A Stop option 184 allows the user to stop the playback of this returned aural data. If there is an ensemble arrangement associated with this material, it is represented in the visual output as chord symbols 186 (i.e. C Major 7, Bb 7(9)), and may also appear as diagrams that are native to the musical instrument of interest. In FIG. 9, the musical instrument of interest is the guitar, so chord diagrams 188 for guitar are presented, in addition to the chord symbols 186. Below the representation for the ensemble arrangement is tablature 182 depicting the solo musical instrument passage associated with this instructional example. However, standard musical notation or notation that is native to other musical instruments, such as bass guitar, drums, or piano, can also be presented using the system.

Those skilled in the art to which the present invention pertains will recognize and be able to practice additional variations in the method and system described above. For example, although the preferred embodiment of the invention primarily depicts how solo musical passages can be created and edited as it relates to the guitar, other temporary web applications can be programmed to describe solo musical passages for other musical instruments, such as the piano, the drums, the bass guitar, or woodwind instruments. Similarly, although the preferred embodiment of the invention depicts how the visual representation of these musical passages can be dynamically generated as guitar tablature, these visual representations could also be dynamically generated as standard musical notation, or any other notational form that is commonly used to describe a solo musical passage for a particular musical instrument.

What is claimed is:

1. A system for remotely creating, publishing and viewing music and textual information for musical instruments on a wide area network, comprising:
    a plurality of client computers connected to the network;
    a web server which transmits a temporary web application via the network to at least one of the client computers, said temporary web application enabling music to be authored at said at least one client computer and to be transmitted to the web sever;
    a web server database for storing the music received from said at least one client computer as meta-data; and
    web server software which interprets the meta-data and dynamically outputs a visual representation and a digital data representation.

2. A system in accordance with claim 1 wherein the meta-data is in ASCII format.

3. A system in accordance with claim 1 wherein said music includes style information.

4. A system in accordance with claim 1 wherein said music includes textual information.

5. A system in accordance with claim 1 wherein said music includes a HTML format.

6. A system in accordance with claim 1 wherein the digital data representation is digital audio.

7. A system in accordance with claim 1 wherein the digital data representation is MIDI.

8. A method for remotely creating, publishing and viewing music and textual information for musical instruments on a wide area network that includes a web server and a plurality of client computers, comprising:
    transmitting a temporary web application from the web server to a client computer;
    utilizing the temporary web application to create music and a corresponding meta-data file at the client computer;
    transmitting the meta-data file to a web server;
    interpreting the meta-data file to create a visual representation and an aural representation; and
    transmitting the visual and the aural representations to a client computer.

9. A method in accordance with claim 8 further comprising the steps of:
    creating textual information; and
    simultaneously transmitting the textual information to the client computer.

10. A method in accordance with claim 8 further comprising the steps of:
    creating HTML information; and
    simultaneously transmitting the HTML information to the client computer.

11. A method in accordance with claim 8 wherein the aural representations are transmitted to the client computer based upon parameters specified by the client computer.

12. A method in accordance with claim 8 wherein the meta-data file is in ASCII format.

13. A system for remotely creating, publishing and viewing music and textual information for musical instruments on a wide area network, comprising:
    a plurality of client computers connected to the network;
    a web server which transmits a web application via the network to at least one of the client computers, said web application running on a browser of the client computer and enabling music to be authored at said at least one client computer and to be transmitted to the web server,
    a web server database for storing the music received from said at least one client computer as meta-data; and
    web server software which interprets the meta-data and dynamically outputs a visual representation and a digital data representation.

14. A system in accordance with claim 13 wherein the web application is a temporary application.

15. A system in accordance with claim 13 wherein the meta-data is in ASCII format.

16. A system in accordance with claim 13 wherein said music includes style information.

17. A system in accordance with claim 13 wherein said music includes textual information.

18. A system in accordance with claim 13 wherein said music includes a HTML format.

19. A system in accordance with claim 13 wherein the digital data representation is digital audio.

20. A system in accordance with claim 13 wherein the digital data representation is MIDI.

21. A method for remotely creating, publishing and viewing music and textual information for musical instruments on a wide area network that includes a web server and a plurality of client computers, comprising:

transmitting a web application from the web server to a client computer the web application running on a browser of the client computer;

utilizing the web application to create music and a corresponding meta-data file at the client computer;

transmitting the meta-data file to a web server;

interpreting the meta-data file to create a visual representation and an aural representation; and transmitting the visual and the aural representations to a client computer.

22. A method in accordance with claim 21 wherein the web application is temporary.

23. A method in accordance with claim 21 further comprising:

creating textual information; and simultaneously transmitting the textual information to the client computer.

24. A method in accordance with claim 21 further comprising:

creating HTML information; and simultaneously transmitting the HTML information to the client computer.

25. A method in accordance with claim 21 wherein the aural representations are transmitted to the client computer based upon parameters specified by the client computer.

26. A method in accordance with claim 21 wherein the meta-data file is in ASCII format.

\* \* \* \* \*